(12) United States Patent
Haraguchi

(10) Patent No.: US 7,102,777 B2
(45) Date of Patent: Sep. 5, 2006

(54) IMAGE PROCESSING SERVICE SYSTEM

(75) Inventor: Tatsuya Haraguchi, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 831 days.

(21) Appl. No.: 10/022,548

(22) Filed: Dec. 20, 2001

(65) Prior Publication Data

US 2003/0117642 A1    Jun. 26, 2003

(51) Int. Cl.
*G06F 15/00*    (2006.01)
(52) U.S. Cl. .................. 358/1.15; 358/1.1; 358/442
(58) Field of Classification Search ............... 358/1.1, 358/1.15, 1.6, 442; 379/100.1, 100.12, 100.03; 709/223, 226
See application file for complete search history.

(56) References Cited

U.S. PATENT DOCUMENTS 6,335,966 B1 *  1/2002  Toyoda .................. 379/100.06

FOREIGN PATENT DOCUMENTS

| JP | 11-196247 | 7/1999 |
|----|-----------|--------|
| JP | 2001-86347 | 3/2001 |

* cited by examiner

*Primary Examiner*—Mark Wallerson
(74) *Attorney, Agent, or Firm*—Foley & Lardner LLP (57) ABSTRACT

The present invention provides a predetermined image processing service via a network to an image processing apparatus having an image information input/output function. In this case, the image processing service is provided by a dedicated server connected to a network or by a local or remote image processing apparatus.

9 Claims, 9 Drawing Sheets

| Encryption scheme | Name | UI information | Encryption scheme | Compression scheme |
|---|---|---|---|---|
| 0001 | Copy | ········· | AA | GH |
| 0002 | Scan | ········· | BX | IJ |
| 0003 | Print | ········· | CY | KL |
| 0004 | Network copy | ········· | DZ | MN |
| 0005 | E-mail transmission | ········· | EP | OP |

Utilization service menu

Copy
Scan
Print
Network copy
E-mail transmission
Facsimile transmission
Other services

FIG. 6B

Basic setting scan

Format    TIFF    PDF
Color     Full color    Monochrome
Disposition    Normal    2 in 1

FIG. 6C

Advanced setting scan

Advertisement display    Unavailable    Available
Logo display    Unavailable    Background
Header    Footer Terminal ID : 0260184

| Type | Service ID | Version ID | Service name | Service address |
|---|---|---|---|---|
| 00 | 09620 | * | Basic processing | http://xxx.yyy/zzz/ |
| 02 | 00153 | 1.0.3.1 | Monochrome setting | http://aaa.bbb/ccc/ |
| 02 | 21480 | 2.1.1.1 | 2 in 1 | http://localhost/def/ |
| 03 | 67732 | * | Addition of advertisement | http://ggg.hhh |
| 03 | 30098 | * | Logo display | http://iii.jjj |
| 02 | 36115 | 2.6.0.1 | PDF setting | http://kkk.lll |

IMAGE PROCESSING SERVICE SYSTEM

BACKGROUND OF THE INVENTION

The present invention relates to an image processing apparatus with image input and output such as a copying machine or composite machine. More particularly, the present invention relates to an image processing service system that executes a variety of image processing services via a network.

As is well known, unlike a conventional analog copying machine, a digital copying machine that is primarily available at present handles image data as digital information in its internal processing.

This digital copying machine can achieve a basic copying function, a scanning function that can acquire paper information as a digital image, and a printing function that can output the digital image on paper.

Further, adding a network connection function to the digital copying machine enables functional expansion via a network such as a facsimile function that transmits/receives image data and a network printing function.

Such a digital copying machine comprising a variety of extended functions in addition to its basic copying function is called a composite machine or an MFP (Multi-Function Peripheral).

A composite machine of such a type integrates a plurality of functions in a complete set, thereby improving user convenience and achieving advantageous effects such as reduction of installation cost or reduction of management burden by reduction of installation space or intensive management/integration of functions.

However, there occurs a problem caused by multi-functioning. That is, there occurs an occurrence of composite problems or a requirement for high level maintenance work because of higher price caused by heavier functioning (lower cost competency), or complicated functions.

In addition, because multi-functions are intensively managed, there applies a restriction that, even when these multi-functions are merely updated/improved, the entire composite machine must be replaced. This means that the user must have a heavy burden.

In the meantime, in general, image information handled by a copying machine/composite machine of such a type is higher in quality and resolution than images handled by an ordinary Web site, and the amount of data is considerably large.

On the other hand, with recent technological innovation, higher speed communication network environments or larger capacity is in progress rapidly. Thus, it is expected to develop a communication infrastructure such that a large amount of data can be transmitted/received in a copying machine/composite machine in real time.

In addition, with fulfillment of such communication networks, a business approach to provide services via the Internet, which is called ASP (Application Service Provider), is more popular.

Although functions required for individual devices or terminals have been packaged conventionally, the ASP approach makes it available to provide required functions as services via a network whenever necessary.

Further, in the Internet environment, data sharing in conformance with a P2P (Peer to Peer) scheme is actively carried out such that any terminal connected to a network can have server and client functions.

Publicly known examples concerning network connection of a copying machine include those disclosed in Jpn. Pat. Appln. KOKAI Publication Nos. 11-196247 and 2001-86347, and the like.

The former discloses a technique for transmitting/receiving image information via a network. The latter discloses a technique for reducing a network burden by compressing image information. However, neither of these publications fails to solve the problem caused by multi-functioning of the above described composite machine.

BRIEF SUMMARY OF THE INVENTION

The present invention has been made in view of the above described circumstances. It is an object of the present invention to provide an image processing service system so as to solve a variety of problems caused by multi-functioning of an image processing apparatus.

An image processing service system according to one embodiment of the present invention provides predetermined image processing services to an image processing apparatus having an image information input/output function via a network.

DETAILED DESCRIPTION OF THE INVENTION

Figure 1:
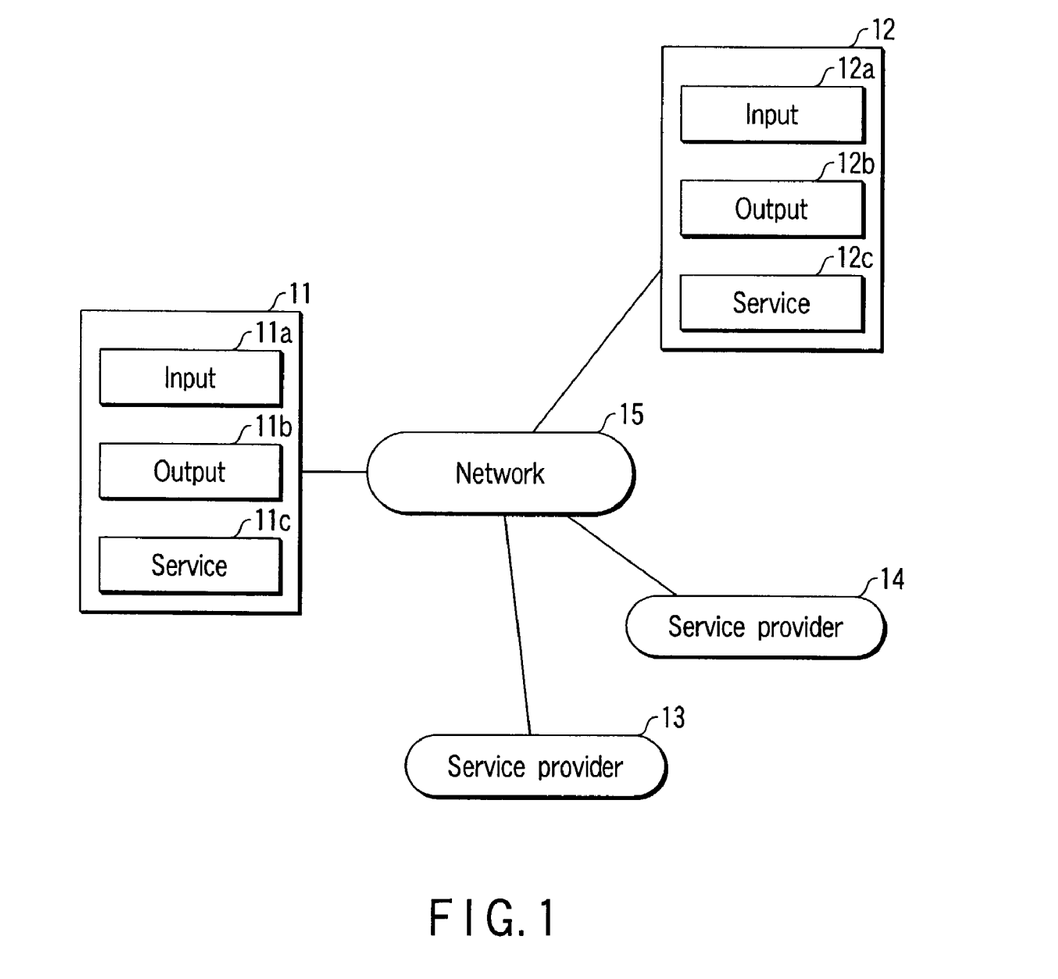
FIG. 1 is a diagram for explaining a general configuration of an image processing service system according to one embodiment of the present invention.

Hereinafter, one embodiment of the present invention will be described in detail with reference to the accompanying drawings. FIG. 1 shows a general configuration of an image processing service system described in the present embodiment.

In this image processing service system, image processing apparatuses 11 and 12 and service providers 13 and 14 each having a dedicated server that provides image processing services are connected to be communicable with each other via a network 15.

Here, the image processing apparatuses 11 and 12 basically comprise image input functions 11a and 12a and image output functions 11b and 12b. These apparatuses can comprise image processing service functions 11c and 12c.

For example, the image processing apparatus 11 carries out image processing for an image input by the image input function 11a by using its own image processing service function 11c, thereby making it possible to output an image via the image output function 11b.

In addition, the image processing apparatus 11 provides access to the service providers 13 and 14 via the network 15, and utilizes its own image processing services, thereby making it possible to apply processing to the input image, and then, output the processed image.

Further, the image processing apparatus 11 provides access to another image processing apparatus 12 via the network 15, and utilizes its own image processing service function 12c, thereby making it possible to apply processing to the input image, and then, output the processed image.

Figure 2:
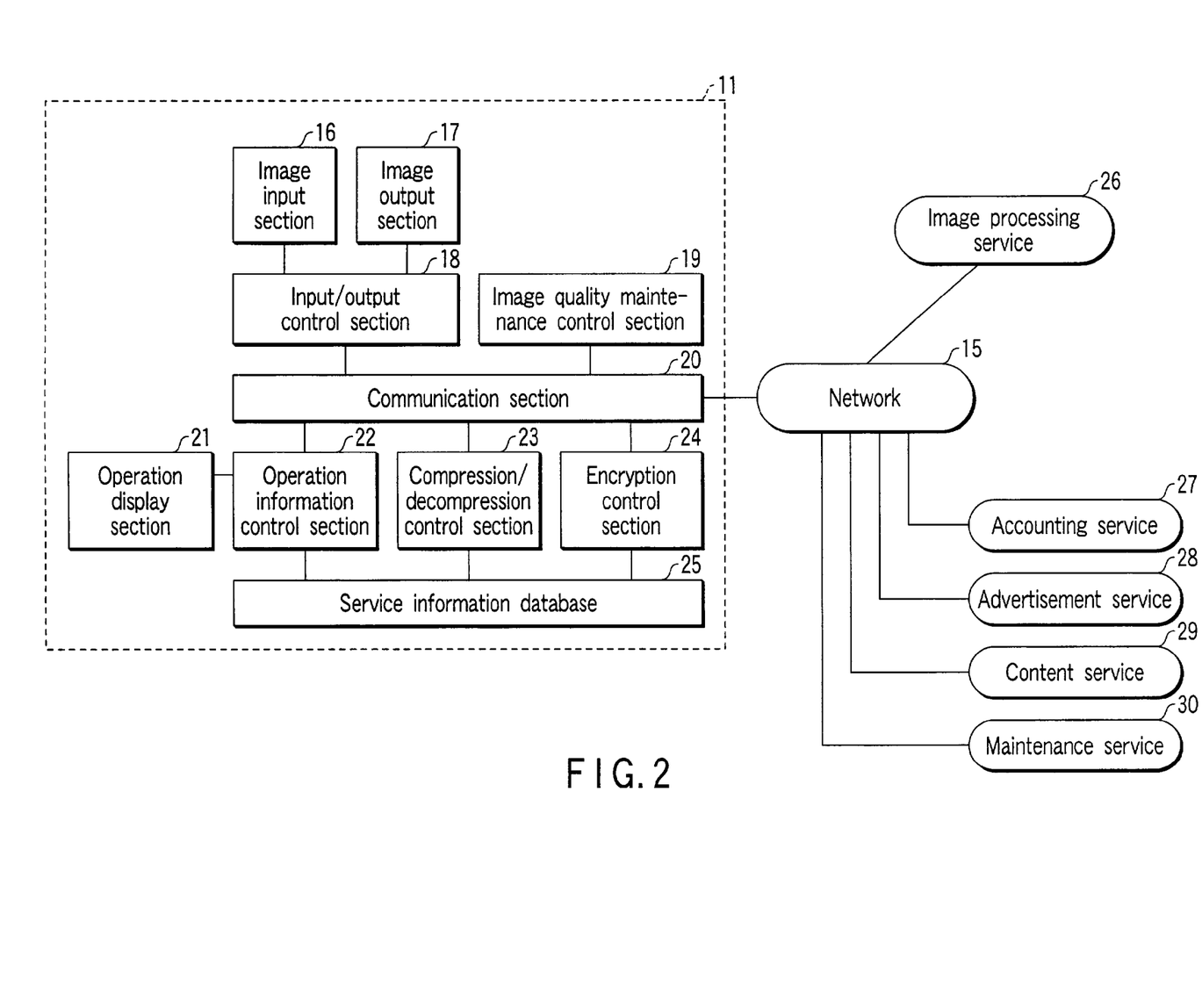
FIG. 2 is a block diagram for explaining a detailed configuration of an image processing apparatus in the present embodiment.

FIG. 2 shows a module configuration of the image processing apparatus 11. Because, the module configuration of another image processing apparatus 12 is similar to that of the image processing apparatus 11, a description thereof is omitted here.

That is, this image processing apparatus 11 comprises: an image input section 16 and an image output section 17 that are basic functions; an input/output control section 18; an image quality maintenance control section 19; a communication section 20; an operation display section 21; an operation information control section 22; a compression/decompression control section 23; an encryption control section 24; and a service information database 25.

The image processing apparatus 11 can provide access to the network 15 via the communication section 20. In addition, this image processing apparatus 11 registers its own services in advance in the service information database 25 relevant to its required image processing services.

Figure 3:
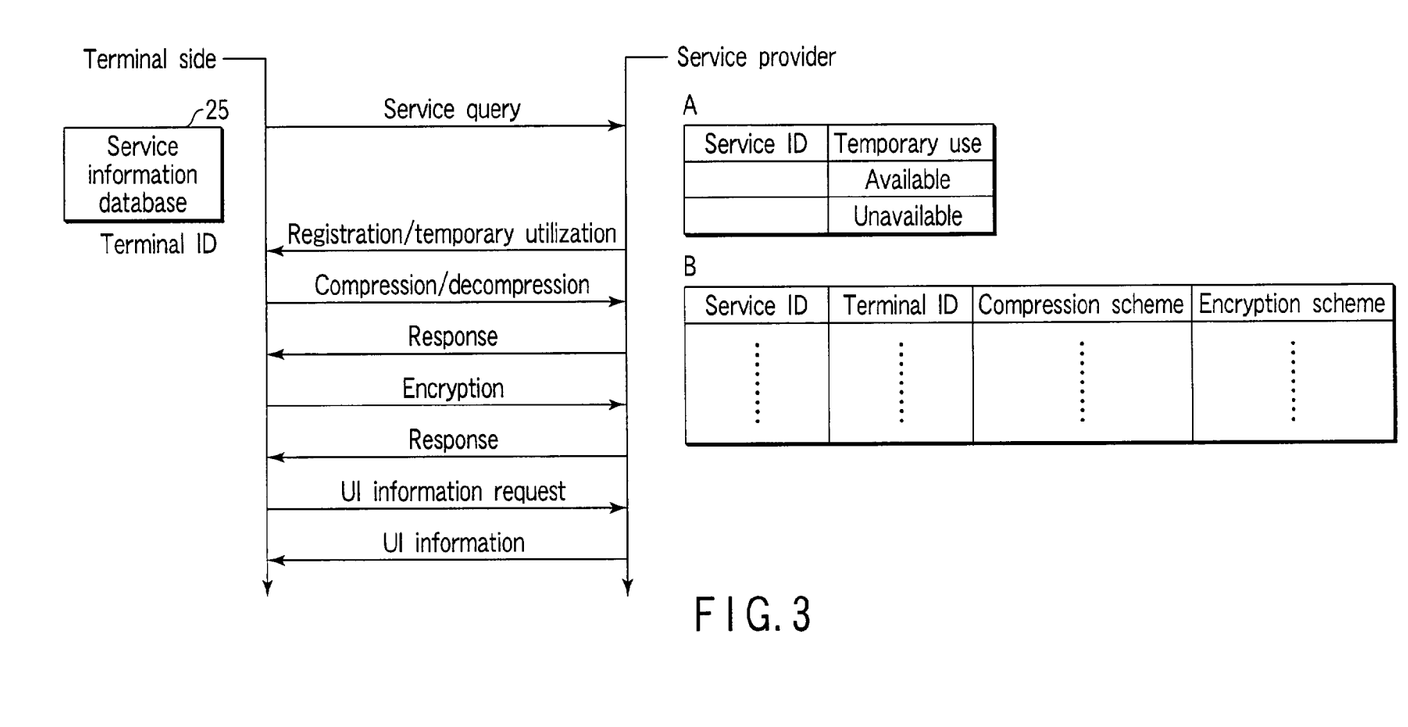
FIG. 3 is a view for explaining a communication method when service registration is carried out for a service information database of the image processing apparatus in the present embodiment.

FIG. 3 shows a communication method when service registration is carried out for the service information database 25. First, when new service registration is carried out by operation UI of a terminal (image processing apparatus 11), it is possible to select whether a service is registered in the terminal or is temporarily utilized without registration.

Depending on whether this service is registered or not, the service provider can discriminate the service charge. As to whether or not the service can be temporarily utilized, it is determined by referring to table A managed by the service provider.

When a service query as to whether the service is registered or is temporarily utilized terminates, adjustment of a compression/decompression scheme of communication data concerning service utilization is then carried out. In adjustment of this compression/decompression scheme, as shown in table B managed by the service provider, the terminal ID is assigned to each terminal is utilized, thereby making it possible to set different parameters for each terminal.

Next, adjustment of an encryption/decryption scheme concerning service utilization is carried out. In the adjustment of the encryption/decryption scheme as well, as shown in table B described above, the terminal ID is utilized, whereby different parameters can be set for each terminal, thereby making it possible to improve security. Lastly, information on operation UI required to utilize services at a terminal is acquired.

Then, a variety of communication information such as service registration/temporary utilization, compression/decompression scheme, encryption/decryption scheme, and information on operation UI is stored in the service information database 25 at the terminal.

Figure 4:
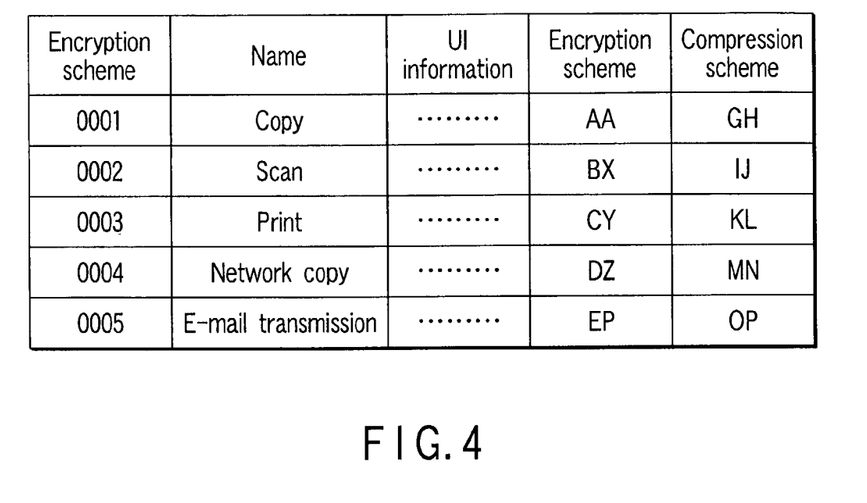
FIG. 4 is a view for explaining a mode of information stored in the service information database of the image processing apparatus in the present embodiment.

FIG. 4 shows a mode of information stored in this service information database 25. The UI information expressed by XML or the like is contained in the field of this UI information. An arbitrary parameter is applied to the field of the encryption scheme or compression scheme.

Here, as shown in FIG. 2, to the network 15, there are reconnected: a service provider 26 that provides general image processing services; and providers 27, 28, 29, and 30 that provide a accounting service, an advertisement service, a content service, a maintenance service, and the like.

The accounting service acquires information on what service is utilized or how many times such service is utilized (service utilization history), and executes a process for asking or collecting a service charge for the apparatus 11. The presence of this service makes it possible to actively expand even a small scale service which does not have a charge collection function.

The advertisement service is a service that refunds an advertisement charge to a user every time the image is displayed or printed by embedding an image with advertisements. This service can reduce image processing costs.

Figure 5:
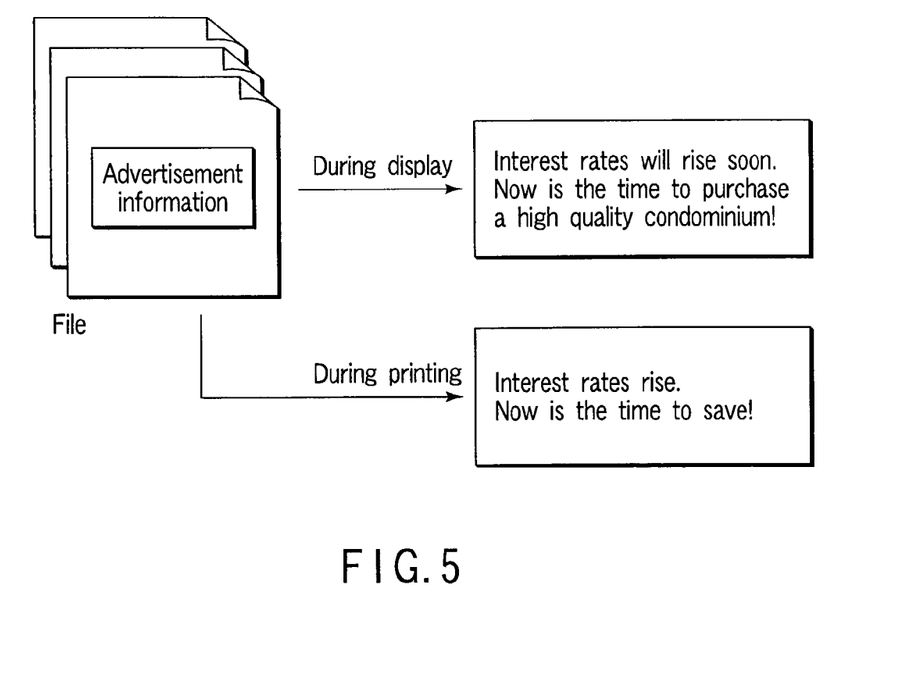
FIG. 5 is a view for explaining an example of displaying an advertisement by using an advertisement service which is one of the image processing services in the present embodiment.

FIG. 5 shows an example of displaying an advertisement by using this advertisement service. The advertisement display service embeds links relevant to advertisement information instead of merely embedding advertisement information in image information. By this advertisement information link section, advertisement information is acquired through a link every time the advertisement is displayed or printed, and the acquired advertisement information is filled in the image information. In an example shown in FIG. 5, when the displaying and printing times are different from each other, real time advertisement information can be presented at their respective different times.

The content service is a service that adds a value added content image to image information to be displayed or printed, thereby collecting a charge. The content images include a decorative frame, a rule, a character logo or the like, for example.

The maintenance service is a service that diagnoses image information transmitted by the image quality maintenance control section 19 incorporated in the image processing apparatus 11, detects a failure with the image processing apparatus 11, monitors a use state of the apparatus 11, and advises replacement of consumables.

Figure 6A:
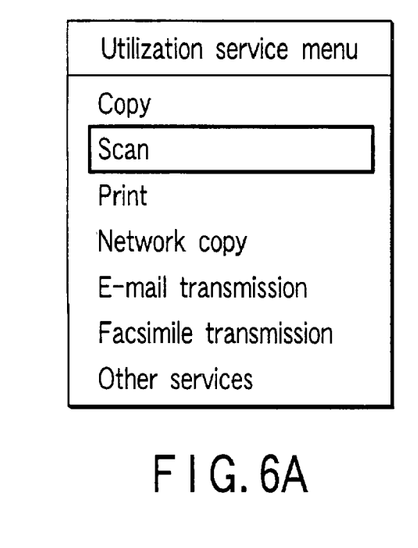
FIG. 6A to FIG. 6C are views for explaining an example of an operation UI of the image processing apparatus in the present embodiment, respectively.
Figure 6B:
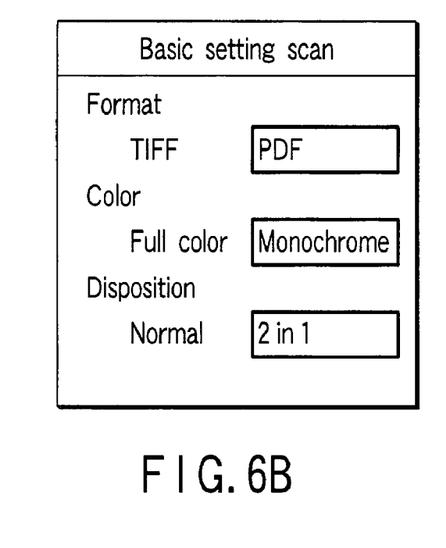
Figure 6C:
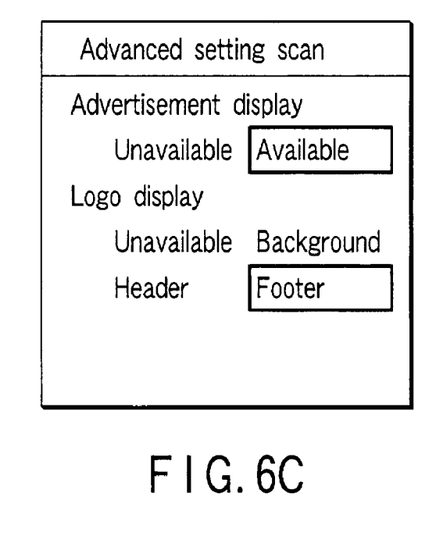

FIG. 6A to FIG. 6C each show an example of the operation UI of the image processing apparatus 11. FIG. 6A presents a list of available image processing services. This list is generated from the service information database 25, as shown in FIG. 2 and FIG. 4.

When a scanning service is selected from this list, for example, a list screen as shown in FIG. 6B is displayed. On this list screen, basic setting items each configuring the scanning service are displayed. FIG. 6B shows a state when PDF is selected as the scanning file format, monochrome is selected as the color/monochrome setting, and 2in1 is selected as the disposition setting.

Next, a list screen shown in FIG. 6C is displayed. Here, option settings can be provided to an image to be processed. In FIG. 6C, it is possible to select whether or not to display an advertisement, to select whether or not to display a specified logo image, and to select an insert location.

The UI information as shown in FIG. 6A to FIG. 6C is stored in a table shown in FIG. 4. As is evident from flow of operation, one "scanning" service can be categorized into detailed services such as "PDF setting", "monochrome setting", "2in1 setting", "addition of advertisement", and "addition of logo".

These individual services may be dispersed over the network 15 or may be packaged inside of the image processing apparatus 11, as shown in FIG. 1. In this manner, a plurality of detailed services are combined with each other, whereby a series of image processing service systems can be constructed.

Figure 7:
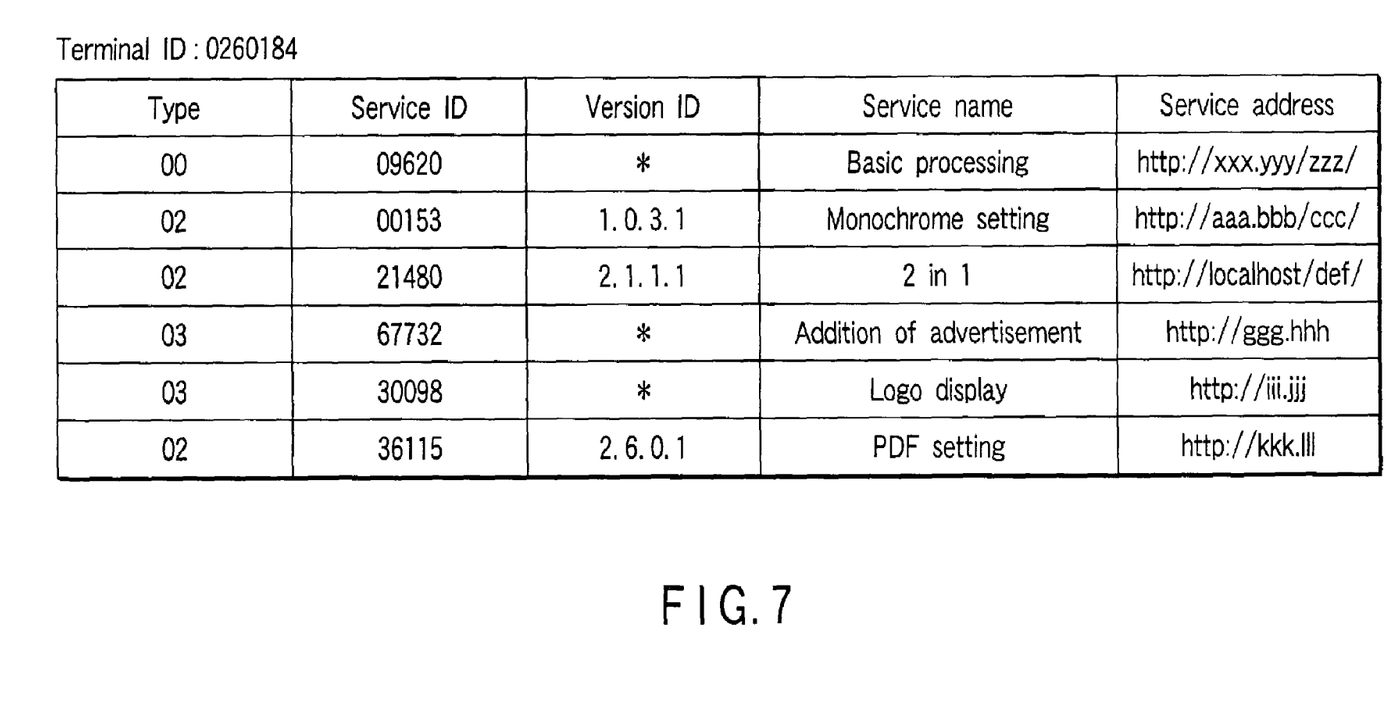
FIG. 7 is a view for explaining a table that generates a screen displayed by the operation UI in the present embodiment.

Information concerning a variety of services displayed by basic setting and advanced setting shown in FIG. 6B and FIG. 6C is managed in a table as shown in FIG. 7. "Type" denotes service type.

Version information on services registered for utilization is stored in the version ID. An asterisk* denotes automatically utilizing the latest version. If a version number and/or level is written, it denotes use of a function of the specified version.

Figure 8:
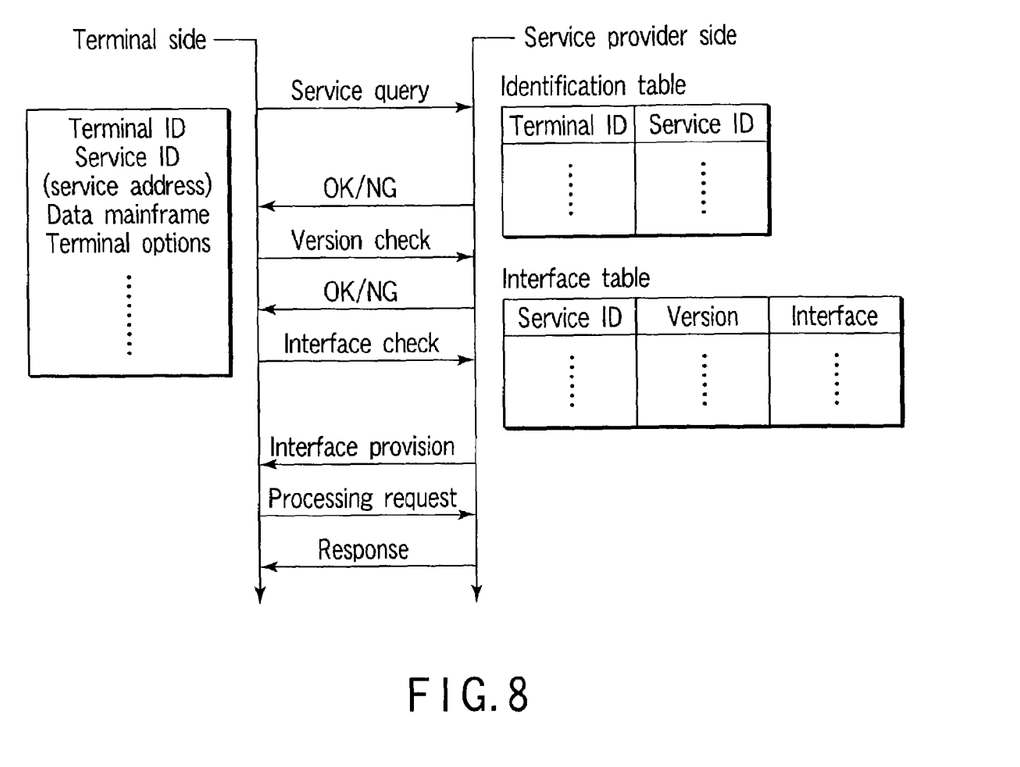
FIG. 8 is a view for explaining a communication scheme during service utilization between the image processing apparatus and a server in the present embodiment.

FIG. 8 shows a communication scheme during service utilization. As shown in FIG. 7, the service address is assigned to each service. First, a service query is carried out for such an address. When the service provider has successfully checked the fact that the terminal ID of a request source is correctly registered, a version check is then carried out. Then, the version information shown in FIG. 7 is referred to.

Next, an interface check is carried out. That is, in each service, such an interface portion may be added/changed by version upgrading or the like. By making an interface change the result of version upgrading, an interface check is carried out every service utilization so as not to rewrite the registration information at each terminal. Lastly, processing target data is transmitted, and the image processing result is returned.

Figure 9A:
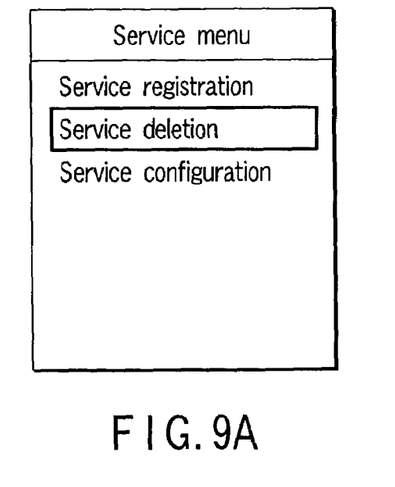
FIG. 9A and FIG. 9B are views for explaining an example of displaying a service menu and a service deletion screen in the present embodiment, respectively.
Figure 9B:
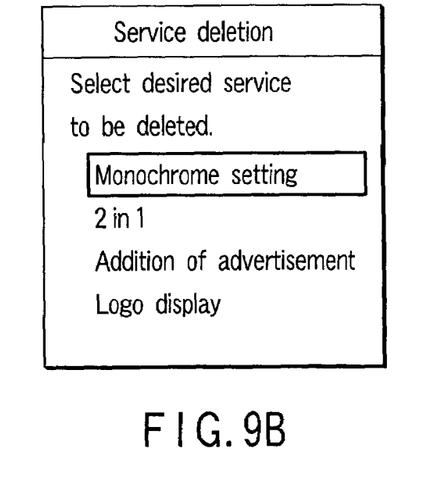

FIG. 9A shows an example of displaying a service menu. There are three types of service menus: service registration, service deletion, and service configuration. First, when a service deletion is selected, as shown in FIG. 9B, the currently registered services are displayed. Then, a desired service is selected from among these registered services, whereby the selected services can be deleted.

Figure 10A:
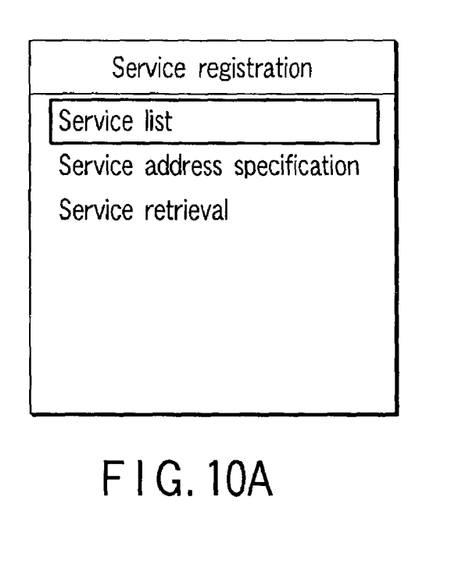
FIG. 10A to FIG. 10D are views for explaining an example of displaying a screen during service registration in the present embodiment, respectively.
Figure 10B:
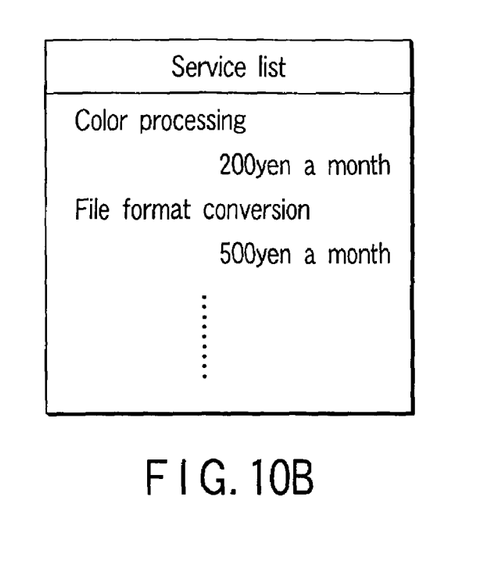

When a service registration is selected, as shown in FIG. 10A, three types of menus containing a service list, a service address specification, and a service retrieval are displayed. When the service list is selected, as shown in FIG. 10B, the contents or prices of services are listed.

Figure 10C:
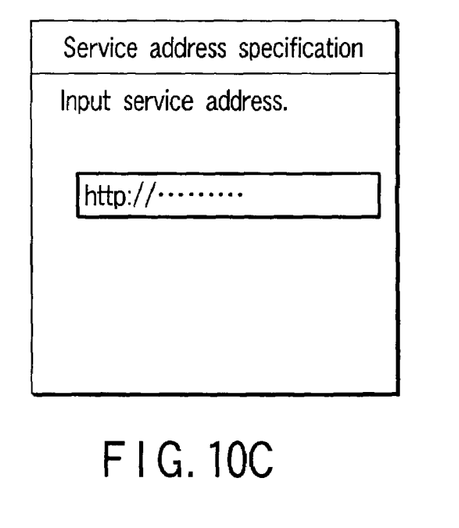
Figure 10D:
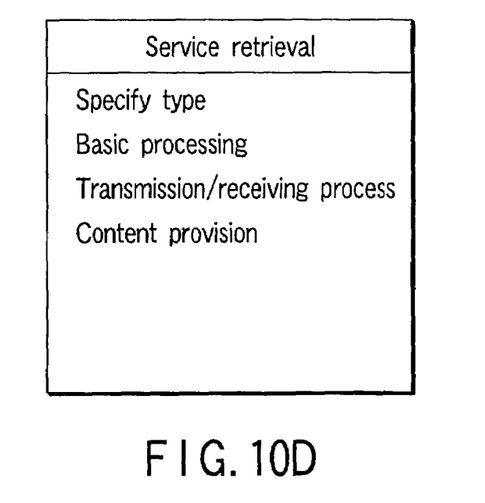

In addition, when the service address specification is selected, as shown in FIG. 10C, a screen for inputting the service address is displayed. Further, when the service retrieval is selected, as shown in FIG. 10D, a variety of services such as service retrieval by type specification, a basic process, a transmission/receiving process, and content provision are displayed to be selectable.

Figure 11A:
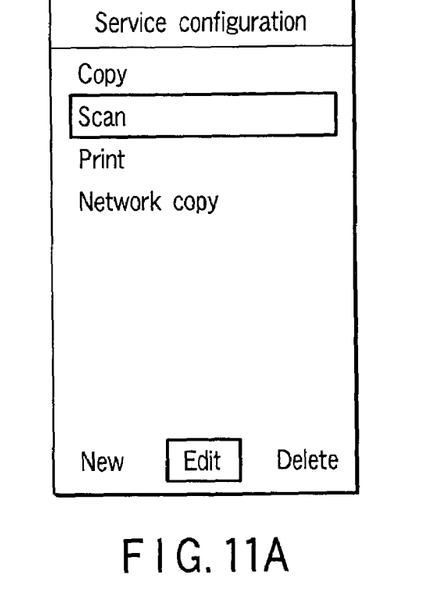
FIG. 11A and FIG. 11B are views for explaining an example of displaying a screen during service configuration in the present embodiment, respectively.
Figure 11B:
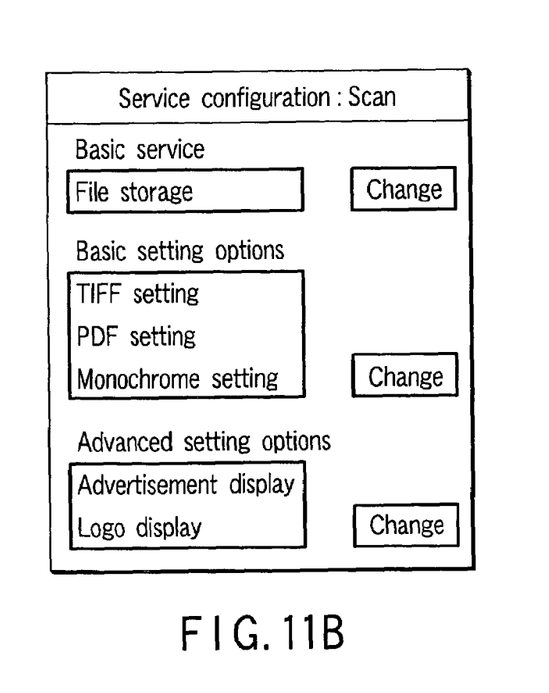

Lastly, when the service configuration is selected, as shown in FIG. 11A, service types are listed. For example, a scan is selected, as shown in FIG. 11B, basic services associated with such scan, i.e., a basic setting option and an advanced setting option can be selected.

With a configuration as shown in the above embodiment, first, functions owned by the image processing apparatus are separated so that the apparatus has only the minimum image input/output function. In this manner, image processing functions other than such an image input/output function are provided as image processing services connected via a network in a manner independent of the apparatus. Then, a series of image processing functions such as a copy function can be achieved by comprising the image processing service with the apparatus image input/output function.

In this way, reducing functions to be packaged in the image processing apparatus simplifies configuration, thus making it possible to ensure price reduction. The structure of the image processing apparatus is simplified, whereby the number of failures that occur can be reduced, and management can be facilitated. Further, service selection enables arbitrary customization at a functional level.

Image processing services may be provided by a dedicated service over a network or may be provided by an image processing device. The image processing service can be utilized by a provider (image processing apparatus) itself or can be utilized by another image processing apparatus via a network.

When the image processing apparatus is thus connected via a network, even if a dedicated server for service provision does not exist, the image processing apparatuses each owning services are connected to each other, whereby a system can be achieved.

Further, in order to achieve an image processing function, a plurality of image processing services can be utilized by combining them with the image input/output function owned by the image processing apparatus. At this time, a plurality of image processing services utilized at the same time may be provided by their different servers or image processing apparatuses.

In this way, services are finely divided, whereby more rich content services can be provided. In addition, more service options are available. A unique function can be achieved by combining services with each other. Even services provided by the different servers can be combined with each other similarly.

In addition, the image processing apparatus has an image information compression/decompression function and an encryption function in order to make communication with an image processing service. Further, before starting communication with the image processing service, preliminary adjustment can be carried out between the image processing apparatus and service as to an image information encryption scheme.

In this manner, high quality service and security can be assured. In addition, exchange of contracts required for a charged service can be carried out. Image data is transmitted in a compressed manner, whereby the network load can be reduced.

Further, in order to utilize an image processing service, service utilization/registration processing is carried out for the image processing apparatus. A service which is not registered for utilization can be newly registered by operation of the image processing apparatus. A less frequent service can be temporarily used without making registration for utilization.

In this manner, new services can be additionally utilized by simple operation at the apparatus. A variety of needs can be satisfied by enabling temporary utilization which is not permanently utilized as an optional function.

In addition, for a service registered for utilization, information concerning user operation required for service utilization is acquired in advance, whereby the information can be stored in the image processing apparatus.

In this way, processing functions on the UI screen or the like for providing a variety of settings, which is required before executing actual image processing, are stored in advance in the image processing apparatus, whereby the network load can be reduced and the processing time can be reduced.

Further, there exists a server that manages the image processing service utilization/registration state of each image processing apparatus or the result of image processing service utilization. This server integrally substitutes a charge request or collection process for service utilization.

In this manner, services can be provided and utilized without worrying about charge payment processing. In addition, a server including a small-scale server free of a charge collection mechanism can offer many services. A community of service provision, which is similar to the existing freeware or shareware, can be constructed.

Image processing services are supplied together with version information. The image processing apparatus checks the version registered for every service utilization, thereby making it possible to receive service of the registered version even if a service itself is updated. Conversely, the latest service can be received irrespective of version information by registering the image processing service of the latest version to allow it to be always utilized.

In this manner, the update state of the service function can be checked. The latest service can be utilized without worrying about whether or not the service is updated. Providing a use restriction function enables price settings which are different from each other for every version.

Further, when the image processing apparatus utilizes an image processing service, first, information concerning the service utilization method is exchanged. Then, services are utilized based on the specified utilization method. In this manner, even if a change occurs with the utilization method due to service update, the service can be utilized in the same way as conventionally. Even if a drastic change is required for a service utilization method or the like, an automatic update function can be carried out.

In addition, link information on advertisement information is embedded in the received image information, and thus, the latest advertisement information is output to be displayed at a time when the information is displayed or output on a screen. Therefore, even if there is a time difference between image processing service utilization and image browsing, the latest advertisement information can be provided.

Further, contents such as a decorative frame, a rule, and a character logo are filled in the received image information so that a service similar to the existing value added paper can be provided.

A maintenance service for finding a problem with the image input side of the image processing apparatus can be utilized from the received image information. In addition, a sample image can be transmitted at a predetermined timing in order to utilize this service.

Further, a maintenance service for determining the replacement time of consumables or the like and maintaining the quality of the apparatus can be utilized from the service utilization history of the image processing apparatus. Furthermore, a service for analyzing a highly frequent service from the service utilization history and recommending a new service can be introduced.

What is claimed is:

1. An image process apparatus comprising:
   an image information input/output function, that makes it possible to selectively access a predetermined image processing service via a network;
   a communication section for communicating, via the network, with a plurality of service providers that provide image processing service information;
   a compression/decompression control section for controlling compression/decompression of image information;
   an encryption control section for controlling encryption/decryption image information;
   a service information database for storing the image processing service information provided by the plurality of service providers; and
   a control section for controlling a selection of whether to register the image processing service information acquired via the network in the service information database, or to temporarily utilize the image processing service information without registration, when registering the image processing service information in the service information database, and controlling storage in the service information database of communication information comprising at least one of a compression/decompression scheme used in the compression/decompression control section, an encryption/decryption scheme used in the encryption control section, or operational information.

2. An image processing apparatus according to claim 1, wherein image processing services that can be accessed via said network can be specified by combing the services.

3. An image processing apparatus according to claim 1, comprising at least one of functions for applying compression/decompression processing and encryption/decryption processing to information communicated via said network.

4. An image processing apparatus according to claim 1, wherein the image processing service that can be accessed via said network can be selected to be registered in advance to ensure regular utilization or not to be registered to ensure temporary utilization.

5. An image processing apparatus according to claim 1, wherein, when the image processing service that can be accessed via said network is registered and utilized, information concerning operation of the registered image processing service is acquired in advance, and is stored.

6. An image processing apparatus according to claim 1, wherein, even if version information added to said image processing service is registered, and said image processing service is updated, the image processing service of the registered version can be accessed.

7. An image processing method of an image processing apparatus comprising:
   accessing an image processing service from one or more service providers via a network;
   selectively registering, in a service information database of the image processing apparatus having an image information input/output function, image processing service information corresponding to the accessed image processing service that is acquired via the network from the one or more service providers, the selective registration of the image processing apparatus being either to register the accessed image processing service or temporarily utilizing the accessed image processing service without registering the accessed image processing service; and
   storing communication information in the service information database corresponding to the accessed image processing service, the communication information comprising at least one of a compression/decompression scheme, an encryption/decryption scheme, and operational information.

8. An image processing method according to claim 7, wherein the accessed image processing service is not provided by the image forming apparatus.

9. An image processing method according to claim 7, further comprising using the accessed image processing service during an image processing operation executing on the image forming apparatus.

\* \* \* \* \*